(12) United States Patent
El-Moussa et al.

(10) Patent No.: US 11,537,723 B2
(45) Date of Patent: Dec. 27, 2022

(54) SECURE DATA STORAGE

(71) Applicant: British Telecommunications Public Limited Company, London (GB)

(72) Inventors: Fadi El-Moussa, London (GB); Theo Dimitrakos, London (GB)

(73) Assignee: British Telecommunications Public Limited Company, London (GB)

( * ) Notice: Subject to any disclaimer, the term of this patent is extended or adjusted under 35 U.S.C. 154(b) by 167 days.

(21) Appl. No.: 16/073,396

(22) PCT Filed: Jan. 26, 2017

(86) PCT No.: PCT/EP2017/051614
§ 371 (c)(1),
(2) Date: Jul. 27, 2018

(87) PCT Pub. No.: WO2017/129660
PCT Pub. Date: Aug. 3, 2017

(65) Prior Publication Data
US 2019/0034645 A1 Jan. 31, 2019

(30) Foreign Application Priority Data
Jan. 29, 2016 (EP) ..................................... 16153533

(51) Int. Cl.
*G06F 21/60* (2013.01)
*G06F 21/62* (2013.01)
*H04L 9/08* (2006.01)

(52) U.S. Cl.
CPC ............ *G06F 21/602* (2013.01); *G06F 21/62* (2013.01); *G06F 21/6218* (2013.01);
(Continued)

(58) Field of Classification Search
CPC .. G06F 21/62; G06F 21/6218; G06F 21/6281; G06F 2221/2141; H04L 9/08
(Continued)

(56) References Cited

U.S. PATENT DOCUMENTS

| | | | | |
|---|---|---|---|---|
| 7,908,656 B1* | 3/2011 | Mu | ...................... | G06F 21/6218 726/22 |
| 7,966,643 B2* | 6/2011 | Nagampalli | ........ | H04L 63/1408 726/1 |

(Continued)

FOREIGN PATENT DOCUMENTS

| | | |
|---|---|---|
| EP | 2 645 618 A1 | 10/2013 |
| WO | WO 2013/091221 A1 | 6/2013 |

(Continued)

OTHER PUBLICATIONS

Squicciarini et al., 2012 8th international conference on network and service management (cnsm) and 2012 workshop on systems virtualiztion management (svm), "Adaptive Data Management for Self-Protecting Objects in Cloud Computing Systems", pp. 140-144 (Year: 2012).*

(Continued)

*Primary Examiner* — Khalil Naghdali
(74) *Attorney, Agent, or Firm* — Patterson Thuente, P.A.

(57) ABSTRACT

A data storage device providing secure data storage for a software application executed by an operating system in a computer system including a file system operation interceptor that detects requests for file system operations in respect of data for the application; a file system operation analyzer that is responsive to the interceptor and that analyses an intercepted file system operation request to identify attributes associated with the file system operation; a comparator that compares the attributes with a predefined security policy definition; a cryptographic unit that encrypts and/or decrypts data using one or more cryptographic functions; wherein the (Continued)

cryptographic unit is operable in response to the comparator to perform an encryption or decryption operation on the data and effect the performance of the requested file system operation by the operating system.

14 Claims, 2 Drawing Sheets

(52) U.S. Cl.
CPC ............ *G06F 21/6281* (2013.01); *H04L 9/08* (2013.01); *G06F 2221/2141* (2013.01)

(58) Field of Classification Search
USPC ........................................................ 713/189
See application file for complete search history.

(56) References Cited

U.S. PATENT DOCUMENTS

| | | | |
|---|---|---|---|
| 8,214,584 B2 | 7/2012 | Johnson | |
| 8,572,410 B1 | 10/2013 | Tkacik et al. | |
| 8,595,170 B2* | 11/2013 | Gladstone | G06N 5/02 706/47 |
| 8,613,103 B2* | 12/2013 | Holtzman | G06F 21/6218 726/27 |
| 9,141,303 B2 | 9/2015 | Kishi et al. | |
| 9,189,609 B1 | 11/2015 | Antony | |
| 9,537,841 B2* | 1/2017 | Schütz | H04L 63/06 |
| 2005/0235143 A1 | 10/2005 | Kelly | |
| 2006/0120526 A1* | 6/2006 | Boucher | H04L 63/12 380/247 |
| 2007/0156670 A1* | 7/2007 | Lim | G06F 9/468 |
| 2008/0080715 A1* | 4/2008 | Lee | G06F 21/602 380/277 |
| 2008/0263372 A1 | 10/2008 | Sako et al. | |
| 2009/0100268 A1* | 4/2009 | Garcia | G06F 21/6209 713/184 |
| 2009/0254572 A1* | 10/2009 | Redlich | G06Q 10/107 |
| 2010/0146582 A1* | 6/2010 | Jaber | G06F 21/6218 726/1 |
| 2010/0242082 A1* | 9/2010 | Keene | H04W 12/0808 726/1 |
| 2010/0257372 A1* | 10/2010 | Seifert | G06F 21/602 713/189 |
| 2011/0231671 A1 | 9/2011 | Locker et al. | |
| 2011/0277013 A1* | 11/2011 | Chinta | G06F 21/6218 726/1 |
| 2011/0296164 A1* | 12/2011 | Boebert | G06F 21/604 713/150 |
| 2011/0296197 A1 | 12/2011 | Konetski et al. | |
| 2012/0036370 A1* | 2/2012 | Lim | H04L 63/0428 713/189 |
| 2012/0297189 A1 | 11/2012 | Hayton et al. | |
| 2013/0097421 A1 | 4/2013 | Lim | |
| 2013/0151848 A1* | 6/2013 | Baumann | H04L 9/3263 713/164 |
| 2013/0191648 A1* | 7/2013 | Bursell | G06F 21/6218 713/189 |
| 2013/0219462 A1* | 8/2013 | Aratsu | G06F 21/10 726/1 |
| 2013/0243197 A1* | 9/2013 | Sherwood | H04L 9/08 380/277 |
| 2014/0208111 A1 | 7/2014 | Brandwine et al. | |
| 2014/0282539 A1 | 9/2014 | Sonnek | |
| 2014/0282833 A1* | 9/2014 | Boyer | G06F 21/57 726/1 |
| 2014/0380035 A1 | 12/2014 | Marinelli et al. | |
| 2016/0306751 A1* | 10/2016 | Amarendran | G06F 12/1408 |
| 2017/0083710 A1* | 3/2017 | Chapman, III | G06F 3/065 |
| 2017/0288863 A1* | 10/2017 | Dimitrakos | H04L 63/0428 |
| 2017/0288871 A1 | 10/2017 | Dimitrakos et al. | |
| 2017/0302696 A1* | 10/2017 | Schutz | H04L 9/30 |
| 2017/0364699 A1* | 12/2017 | Goldfarb | G06F 21/6227 |

FOREIGN PATENT DOCUMENTS

| | | |
|---|---|---|
| WO | WO 2017/129530 A1 | 8/2017 |
| WO | WO 2017/129657 A1 | 8/2017 |
| WO | WO 2017/129659 A1 | 8/2017 |

OTHER PUBLICATIONS

Graf et al., 2005 IEEE International Conference on Cyberworlds (CW'05), "A Capability-Based Transparent Cryptographic File System", (Year: 2005).*
Application and Filing Receipt for U.S. Appl. No. 15/507,840, filed Mar. 1, 2017, Inventor(s): Dimitrakos et al.
Application and Filing Receipt for U.S. Appl. No. 16/073,363, filed Jul. 27, 2018, Inventor(s): El-Moussa et al.
Application and Filing Receipt for U.S. Appl. No. 16/073,424, filed Jul. 27, 2018, Inventor(s): El-Moussa et al.
Application as filed for U.S. Appl. No. 16/073,453, filed Jul. 27, 2018, Inventor(s): El-Moussa et al.
International Search Report and Written Opinion for PCT Application No. PCT/EP2015/071773 dated Oct. 26, 2015; 8 pages.
Zhang et al: "CloudVisor: Retrofitting Protection of Virtual Machines in Multi-tenant Cloud with Nested Virtualization"; Oct. 23, 2011 (Oct. 23, 2011). pp. 203-216. XP058005755. DOI: 10.1145/2043556. 2043576 ISBN: 978-1-4503-0977-6; 14 pages.
Muller, et al.: TreVisor "OS-Independent Software-Based Full Disk Encryption Secure against Main Memory Attacks" Department of Computer Science Friedrich-Alexander University of Erlangen—Nuremberg F. Bao, P. Samarati, and J. Zhou (Eds.): ACNS 2012, LNCS 7341, pp. 66-83, 2012. Springer-Verlag Berlin Heidelberg 2012; Jun. 26, 2012 (Jun. 26, 2012). pp. 66-83. XP055284332. ISBN: 978-3-642-31284-7; https://mirror.robert-marquardt. comjdownloadsjtrevisor.pdf ; 18 pages.
International Search Report and Written Opinion for PCT Application No. PCT/EP2017/051339 dated Mar. 31, 2017; 10 pages.
VMware vSphere Storage; Update 1; Modified Jul. 12, 2018; VMware vSphere 6.0 VMware ESXi 6.0 vCenter Server 6.0; VMware, Inc. 3401 Hillview Ave. Palo Alto, CA 94304 Copyright © 2009-2018; https://docs.vmware.com/; 315 pages.
Popek et al., "Formal Requirement for Virtualizable Third Generation Architectures"; University of California, Los Angeles; Communications of the AMC; Jul. 1974, vol. 17, No. 7; 10 pages.
Bremer; Intercepting System Calls on x86_64 Windows; May 15, 2012; Intercepting System Calls on x86_64 Windows | Development & Security; [retrieved Jul. 26, 2018]; http://jbremer.org/intercepting-system-calls-on-x86_64-windows/ 9 pages.
International Search Report and Written Opinion for PCT Application No. PCT/EP2015/051613 dated Apr. 20, 2017; 10 pages.
International Search Report and Written Opinion for PCT Application No. PCT/EP2015/051610 dated Mar. 31, 2017; 8 pages.
International Search Report for corresponding International Application No. PCT/EP2017/051614 dated Mar. 31, 2017; 3 pages.
Written Opinion for corresponding International Application No. PCT/EP2017/051614 dated Mar. 31, 2017; 5 pages.
Myers et al., University of Maryland; Intercepting Arbitrary Functions on Windows, UNIX, and Macintosh OS X Platforms CS-TR-4585, UMIACS-TR-2004-28; Center for Bioinformatics and Computational Biology Institute for Advanced Computer Studies, University of Maryland, MD 20742 USA CS-TR-4585, UMIACS-TR-2004-28.
Bragg, Robert; The Encrypting File System, "How EFS Works" [retrieved on Jul. 26, 2018]; https://technet.microsoft.com/en-us/library/cc700811.aspx#mainSection 14 pages.
Seung-Woo Kim (Intel); Intercepting System API Calls Intel® Software (https://software.intel.com/en-us/user/336519), published on Mar. 7, 2012; 13 pages.
Hunt et al; "Detours: Binary Interception of Win32 Functions"; Microsoft Research One Microsoft Way Redmond, WA 98052; Published in Proceedings of the 3rd USENIX Windows NT Symposium. Seattle, WA, Jul. 1999; http://research.microsoft.com/sn/detours; 9 pages.

(56) References Cited

OTHER PUBLICATIONS

International Preliminary Report on Patentability for Application No. PCT/EP2017/051614, dated Aug. 9, 2018, 7 pages.
Menezes A., et al., "Handbook of Applied Cryptography," 1997, CRC Press LLC, USA, 49 pages.

* cited by examiner

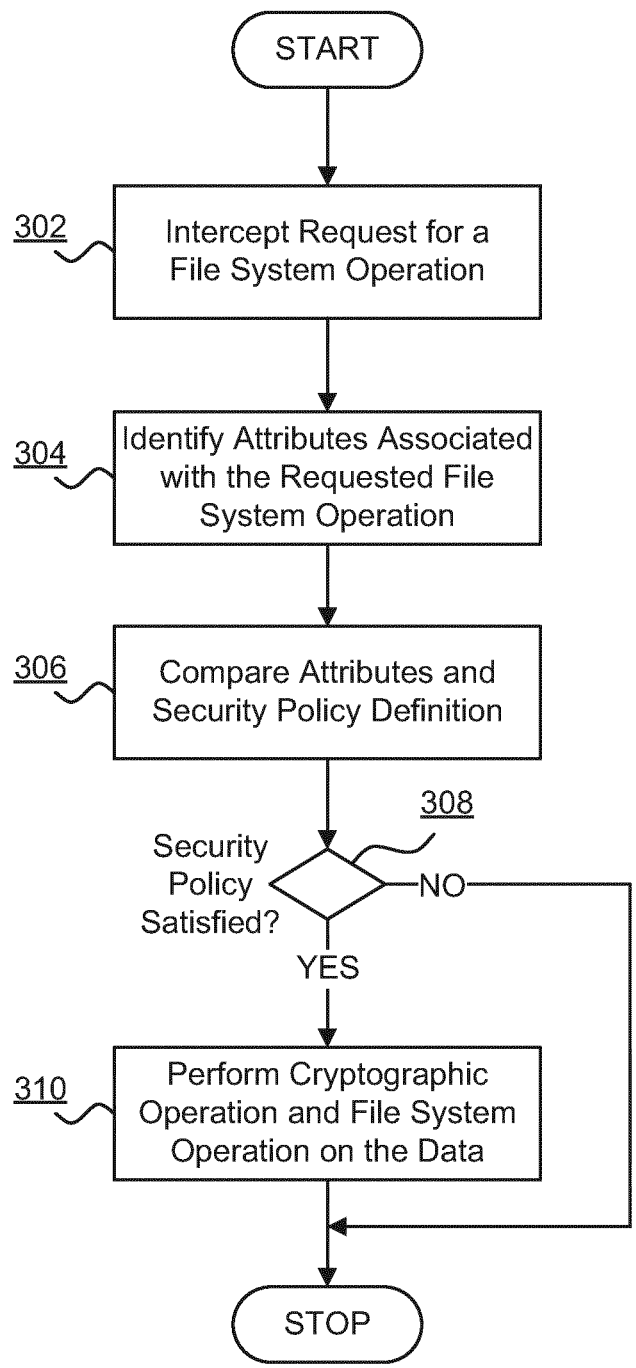

SECURE DATA STORAGE

CROSS-REFERENCE TO RELATED APPLICATION

The present application is a National Phase entry of PCT Application No. PCT/EP2017/051614, filed Jan. 26, 2017, which claims priority from EP Patent Application No. 16153533.1, filed Jan. 29, 2016, each of which is hereby fully incorporated herein by reference.

TECHNICAL FIELD

The present disclosure relates to the encryption of files in a file system. In particular, the disclosure relates to file access control on an application or process basis.

BACKGROUND

Data encryption is employed to secure data against unauthorized access. For example, a data file stored in a file system of a computer system can be encrypted such that unauthorized users accessing the file are unable to decrypt the file without one or more requisite cryptographic keys.

Additionally, software applications themselves can be encrypted. For example, a sensitive software application such as an application generating, accessing or storing sensitive information or an application employing sensitive algorithms or techniques can be encrypted when stored in a file system. Encryption protects such applications from unauthorized access, execution and misuse. For example, a user possessing one or more requisite cryptographic keys may be able to access and/or execute an encrypted application to the exclusion of others.

Access control is provided on a user-basis such that a user having associated one or more cryptographic keys and, in some cases, being associated with a security policy such as an access control policy, list or the like, is able to access encrypted files and/or applications such as by read operations, write operations and/or execute operations. For example, MICROSOFT WINDOWS Encrypting File System (EFS) described in detail at www.technet.microsoft.com ("How EFS Works", Microsoft TechNet Library, accessed 27 Jan. 2016) provides for the encryption of data stored to a file system (MICROSOFT and WINDOWS are registered trademark of MICROSOFT CORPORATION). Using EFS encryption and decryption are performed by an EFS driver operating in a kernel mode of an operating system in conjunction with a kernel file system runtime library (FSRTL). The encryption in EFS employs a combination of symmetric and asymmetric keys where the asymmetric keys are associated with a particular user. Thus, using EFS, data stored to a file system are encrypted on a user basis such that any file access policies are user specific.

Thus access control for data stored securely using EFS must be administered on a per-user basis. Similarly, access control for applications stored in encrypted form must be administered on a per-user basis. Where all data for an application used by potentially multiple users is to be stored securely, such data will only be secured for each user individually. Thus there is a need to address the considerable disadvantages of the known techniques to provide for the secure storage of data in a computer system.

SUMMARY

The present disclosure accordingly provides, in a first aspect, a computer implemented method of secure data storage for a software application executed by an operating system in a computer system comprising: in response to a request for a file system operation in respect of data for the application: a) identifying attributes associated with the requested file system operation; b) retrieving a security policy definition; c) comparing the attributes and the security policy definition and, responsive to the comparison, performing a cryptographic operation and the file system operation on the data.

In some embodiments, the cryptographic operation is one of an encryption and decryption operation using at least one cryptographic key.

In some embodiments, the at least one cryptographic key is selected based on an association between the key and the software application.

In some embodiments, the association between the at least one cryptographic key and the software application is defined by the security policy.

In some embodiments, the attributes include one or more of: attributes of the data; attributes of a user of the application; attributes of the application; temporal attributes; and a type of the requested file system operation.

In some embodiments, the attributes of the data include one or more of: a file name; file system path; and file system attributes of the data.

In some embodiments, the attributes of the user include one or more of: a user identifier; and a group membership or class of the user.

In some embodiments, the attributes of the application include one or more of: an identifier of the application; an identifier of one or more processes executed by or for the application; a name of a process executed by or for the application; a parent process of the application; a file name of the application; a file system path of a file of the application; a version of the application; and an operating mode of the application.

In some embodiments, the temporal attributes include a time associated with the requested file system operation.

In some embodiments, the type of the requested file system operation includes one of: a read operation; a write operation; and an execute operation.

In some embodiments, the security policy definition includes a definition of one or more criteria for permitting the file system operation based on attributes associated with the file system operation.

In some embodiments, the one or more criteria of the security policy definition include one or more of: attributes of data; attributes of a user of an application; attributes of an application; temporal attributes; and a type of a file system operation.

In some embodiments, comparing the attributes and the security policy definition includes determining satisfaction of the criteria of the security policy definition.

The present disclosure accordingly provides, in a second aspect, a data storage device providing secure data storage for a software application executed by an operating system in a computer system comprising: a file system operation interceptor that detects requests for file system operations in respect of data for the application; a file system operation analyzer that is responsive to the interceptor and that analyses an intercepted file system operation request to identify attributes associated with the file system operation; a comparator that compares the attributes with a predefined security policy definition; a cryptographic unit that encrypts and/or decrypts data using one or more cryptographic functions; wherein the cryptographic unit is operable in response to the comparator to perform an encryption or decryption operation on the data and effect the performance of the requested file system operation by the operating system.

The present disclosure accordingly provides, in a fifth aspect, a computer program element comprising computer program code to, when loaded into a computer system and executed thereon, cause the computer to perform the steps of the method set out above.

BRIEF DESCRIPTION OF THE FIGURES

Embodiments of the present disclosure will now be described, by way of example only, with reference to the accompanying drawings, in which:

FIG. 3 is a flowchart of a method of the data storage component of FIG. 2 in accordance with embodiments of the present disclosure.

DETAILED DESCRIPTION

Figure 1:
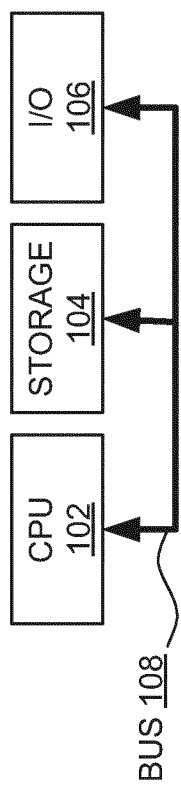
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
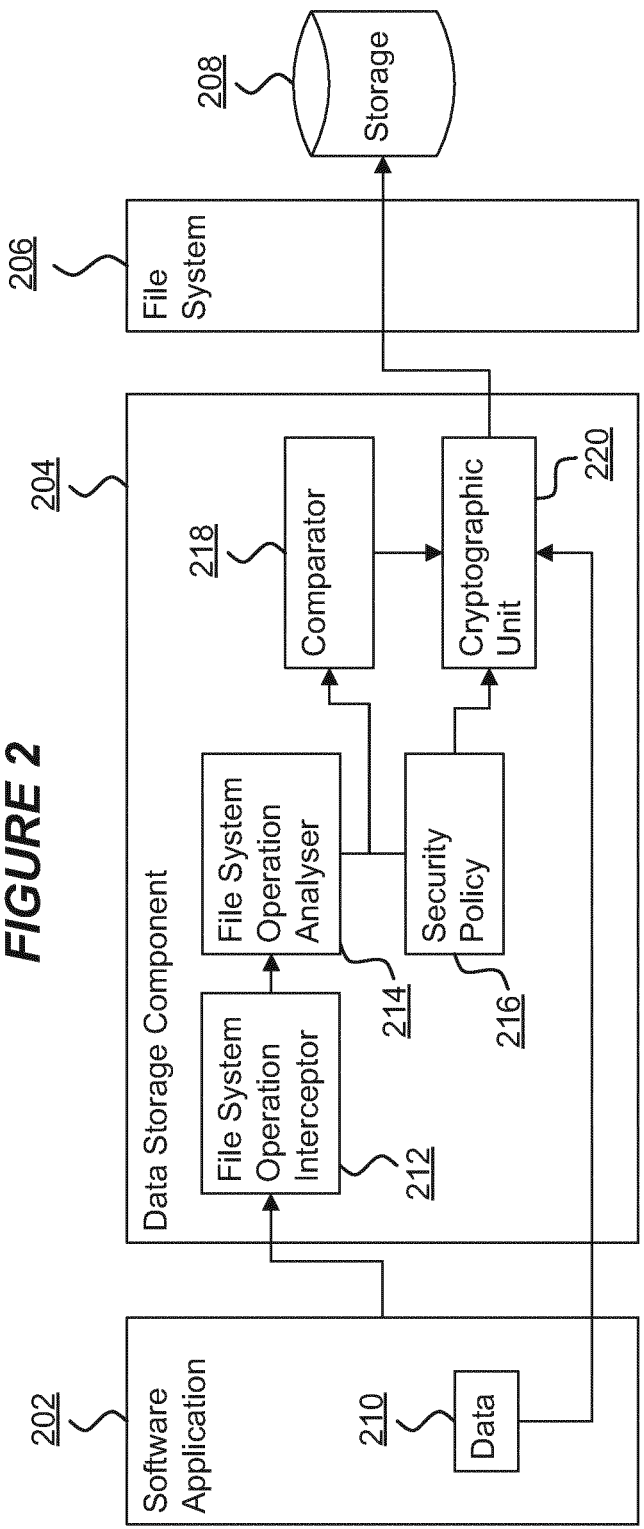
FIG. 2 is a schematic illustration of a data storage component in accordance with embodiments of the present disclosure.

FIG. 2 is a schematic illustration of a data storage component 204 in accordance with embodiments of the present disclosure. The data storage component 204 is provided as a hardware, software, firmware or combination component for providing secure storage of data in a storage 208 for a software application 202 executed by an operating system of a computer system. The storage 208 is any storage suitable for the storage of data files such as a volatile or non-volatile storage including: disk; tape; flash memory; random access memory; and other suitable storage means as will be apparent to those skilled in the art.

The software application is an executable software component such as a binary, bytecode, interpreted or other computer program executed or executable by and in cooperation with an operating system running on the computer system. The software application 202 operates with the operating system to invoke, call, trigger, employ or otherwise utilize functions, procedures, services, routines, tasks, interfaces and other resources of the operating system such as application programming interfaces (APIs). In particular, the application 202 is operable to request the invocation of file system 206 APIs of the operating system such as functions for: the creation of a file; the writing of application data 210 to a file for the storage of the data 210 in a storage 208 of the computer system; the reading of application data 210 from a file for the retrieval of the data 210 from the storage 208; and the like. Such operations are affected by the operating system's file system 206 and can be requested by the application 202 calling operating system APIs to achieve a required file system operation. Such APIs are implemented by the file system 206 such as part of a library of the operating system (e.g. a dynamic link library or the like) or an integral or statically linked part of the operating system kernel or core function set. Thus the application executes, calls, branches to, invokes or otherwise requests file system operations in this way and the application 202 is said to request file system operations of the operating system by way of file system 206 APIs.

The data storage component 204 is configured to respond to file system operation requests in respect of data 210 for the application 202. Accordingly, the data storage component 204 is able to access the software application 202 at runtime and may perform monitoring, logging, tracing or other functions in respect of the software application 202. Thus in some embodiments the data storage component 204 executes in a privileged mode of operation of the operating system to permit the data storage component 204 access to process information of the application 202 and to permit intervention by the data storage component 204 in the execution of the application 202, in particular with respect to file system operations requested by the application 202. This can be achieved, for example, by way of a file system operation interceptor 212 as a software, hardware, firmware or combination component that detects requests for file system operations in respect of data 210 for the application 202. The file system operation interceptor 212 can be implemented in a number of ways. For example, the file system operation interceptor 212 can detect system API calls by the application 202 to identify file system operation requests by the application 202 corresponding to file system API invocations. Such detection can be achieved by intercepting a request by the application 202 for a file system operation such as by a software technique known as "hooking".

Hooking is a technique for intercepting function calls, messages or events passed between software components such as the application 202 and the windows file system API. Hooking can be achieved by physical modification of the source or executable code of the application 202, such as by pre-processing the code to adapt the APIs used by the code to refer instead to functions of the data storage component 204. Where modification of the application 202 code is not possible or desirable, the operating system facilities themselves may be modified such as a library containing code for the provision of file system APIs. Such modification of the API code can include identifying an entry point of a particular API function or routine and making an alteration to the entry point to refer to functions of the data storage component 204. Such modifications can be achieved by, for example, employing a binary code disassembler to identify the entry point. In a further alternative approach, the features of a dynamic linkage between the application 202 and the file system APIs such as a dynamic link library can be altered. For example an import table of the application 202 can be modified to load an additional library containing all or part of the data storage component 204. In a further alternative, a wrapper library can be employed which wraps the operating system library providing the file system APIs. The wrapper library can include or refer to the data storage component 204 and can then be linked by the application 202. At runtime the application 202 requesting file system operations would cause the invocation of functions of the wrapper library which can itself defer or refer to the operating system library as required.

Alternative hooking techniques can be employed at a runtime of the application 202 such as by way of facilities and/or services provided by an operating system itself or software associated with the operating system. The paper "Intercepting Arbitrary Functions on Windows, UNIX, and Macintosh OS X Platforms" (Daniel Myers and Adam Bazinet, University of Maryland, 2004) describes a number of techniques for intercepting functions in a variety of operating systems. For example, the Detours library from MICROSOFT provides for the interception of system function calls in order to instrument code or extent operating system functionality (see "Detours: Binary Interception of Win32 Functions", Galen Hunt and Doug Brubacher, Microsoft Research, 1999). Jurrian Bremer also describes techniques for intercepting system calls in his paper "Intercepting System Calls on x86_64 Windows" (2012, www.j-bremer.org). Further, the paper "Intercepting System API Calls" (Seung-Woo Kim, Intel, 2004) describes various techniques for function interception and presents a generic method to achieve function interception. Alternative tools and techniques for providing hooking for applications executed by an operating system are described, listed and referenced at www.en.wikipedia.org.

Thus in one embodiment the file system operation interceptor 212 provides an entry point for the data storage component 204 triggered by the request for a file system operation by the application 202 such as by way of hooking or otherwise intercepting such operations. The data storage component further includes a file system operation analyzer 214 as a software, hardware, firmware or combination component for analyzing an intercepted file system operation request to identify attributes associated with the requested file system operation. The attributes identified by the analyzer 214 include attributes on the basis of which a security policy 216 may be defined. The security policy 216 is a policy defining the circumstances in which application data 210 can be cryptographically processed (e.g. encrypted or decrypted) for storage or retrieval in the storage 208 for application 202. Further, the security policy 216 is operable to provide one or more encryption keys for the cryptographic processing of application data 210 when the required circumstances are satisfied. Thus the security policy 216 can define criteria based on attributes associated with a requested file system operation, the satisfaction of which determines whether the application 202 is permitted to encrypt and store or retrieve and decrypt application data 210 to/from the storage 208. Notably, the policy 216 can include multiple criteria or sets of criteria associated with potentially numerous attributes. Further, the policy 216 may include storage of cryptographic keys required to implement a security, such as symmetric or asymmetric keys, or alternatively the policy 216 can refer to, associate with or access a separate secure key store or the like which may or may not be part of the data storage component.

The attributes referenced by criteria of the security policy 216 are identified by the analyzer 214 and can include one or more of: attributes of the application data 210; attributes of a user of the application 202; attributes of the application 202; temporal attributes; and a type of the requested file system operation such as a read operation or a write operation.

Attributes of the application data 210 can include one or more of: a file name for storage or retrieval of the data; a file system path for storage or retrieval of a file; and file system attributes of the data such as read/write/hidden/system/archive attributes, file date and/or timestamp, file size, checksum, cyclic redundancy check information, file age and other attributes as will be apparent to those skilled in the art. Attributes of the user include one or more of: a user identifier such as a user name, certificate or the like; and a group membership or class of the user. Attributes of the application 202 include one or more of: an identifier of the application 202 such as an application name, certificate or the like; an identifier of one or more processes executed by or for the application such as a process name, process number or the like; a name of a process executed by or for the application; a parent process of the application; a file name of the application; a file system path of a file of the application; a version of the application; and an operating mode of the application. The temporal attributes include a time associated with the requested file system operation.

Thus the file system operation analyzer 214 analyses the context of an intercepted file system operation request to identify attributes required for comparison with one or more entries in the security policy 216. Attributes of the requested file system operation are compared with the security policy 216 by a comparator component 218 as a software, hardware, firmware or combination component. The comparator 218 determines if criteria of the security policy 216 are satisfied to determine if the requested file system operation should be effected. Thus, the comparator 218 can receive and compare attribute information from the analyzer 214 and criteria from the policy 216 to determine if policy criteria are satisfied.

A cryptographic unit 220 is a hardware, software, firmware or combination component responsive to the comparator 218 for performing a cryptographic function such as data encryption or decryption according to the file system operation requested and to effect the requested file system operation by the operating system such as by reference to a file system 206 API of the operating system. Thus, where the requested file system operation is the storage of application data 210 and the comparator 218 determines that criteria of the security policy 216 are satisfied, the cryptographic unit 220 performs encryption of the application data 210 using one or more cryptographic keys from the security policy 216 and effects storage of the application data 210 to the storage by way of the operating system file system 206. Further, where the requested file system operation is the retrieval of application data 210 and the comparator 218 determines that criteria of the security policy 216 are satisfied, the cryptographic unit 220 performs a read operation of the application data 210 from the storage 208 by way of the operating system file system 206 and performs decryption of the application data 210 using one or more cryptographic keys from the security policy 216.

In some embodiments, the security policy 216 identifies one or more cryptographic keys in association with the software application 202 such that each application executing in a computer system has associated keys that can be separate keys. Thus, in this way, access control for application data 210 stored securely by encryption can be administered on a per-application basis and user credentials or user key associations are not required. Thus, where all data for an application used by potentially multiple users is to be stored securely, such data can be secured for all users with encryption using keys associated with the application. Notably, the application data 210 can include the application 202 itself such as all or part of the application code for the application 202. Further, the one or more cryptographic keys for encrypting and decrypting the application data 210 can include a symmetric key for efficient encryption of the data and an asymmetric key pair for encryption of the symmetric key (since encryption performance using an asymmetric key is generally poor relative to symmetric key encryption which can be particularly undesirable for larger quantities of data). Such asymmetric key pairs can be associated with the application 202 such that the private key is stored securely for the application 202 and the public key is maintained in, for example, a certificate for the application 202.

While the arrangement of FIG. 2 is illustrated and described with reference to a single computer system it will be appreciated by those skilled in the art that such an arrangement could equally be employed in distributed computing arrangements where one or more of the elements of FIG. 2 are provided on a separate physical or virtual computer system such as a networked or cloud computing environment. Furthermore, the computer system could be a physical computing device or a virtualized computing device such as a virtual machine executing with a hypervisor. Thus similarly the storage 208 can be a virtualized storage device such as a virtualized disk that may be implemented in a single physical storage device or distributed across a number of potentially different storage devices.

FIG. 3 is a flowchart of a method of the data storage component 204 of FIG. 2 in accordance with embodiments of the present disclosure. Initially at 302 the method intercepts a request for a file system operation. Such interception can be achieved by the file system operation interceptor 212. Responsive to the interception the method identifies attributes associated with the requested file system operation at 304, such as by the file system operation analyzer 214. At 306 the comparator 218 compares the attributes of the requested file system operation with the security policy 216. Where criteria of the security policy are satisfied at 308 the method performs an appropriate cryptographic operation (e.g. encryption or decryption) and file system operation (e.g. read or write) for the application data 210 at 310.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present disclosure has been described in relation to the above described example embodiments, the invention is not limited thereto and that there are many possible variations and modifications which fall within the scope of the claims.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of secure data storage for a software application executed by an operating system in a computer system comprising:
   in response to a request for a file system operation in respect of data for the software application, the request identified by a file system operation interceptor executing on the computer system:
      identifying attributes associated with the requested file system operation that are independent of user attributes;
      retrieving a security policy definition defining circumstances in which application data can be cryptographically processed;
      comparing the attributes and the security policy definition, wherein the security policy definition includes a definition of one or more criteria for permitting the file system operation and the comparing includes determining if the attributes associated with the requested file system operation satisfy the one or more criteria; and
      responsive to the comparison, performing a cryptographic operation and the file system operation on the data, such that access control for the data is administered on a per-application basis.

2. The method of claim 1, wherein the cryptographic operation is one of an encryption or a decryption operation using at least one cryptographic key.

3. The method of claim 2, wherein the at least one cryptographic key is selected based on an association between the at least one cryptographic key and the software application.

4. The method of claim 2, wherein the association between the at least one cryptographic key and the software application is defined by the security policy definition.

5. The method of claim 1, wherein the attributes include one or more of: attributes of the data; attributes of a user of the software application; attributes of the software application; temporal attributes; or a type of the requested file system operation.

6. The method of claim 5, wherein the attributes of the data include one or more of: a file name; a file system path; or file system attributes of the data.

7. The method of claim 5, wherein the attributes of the user include one or more of: a user identifier; or a group membership or a class of the user.

8. The method of claim 5, wherein the attributes of the software application include one or more of: an identifier of the software application; an identifier of one or more processes executed by or for the software application; a name of a process executed by or for the software application; a parent process of the software application; a file name of the software application; a file system path of a file of the software application; a version of the software application; or an operating mode of the software application.

9. The method of claim 5, wherein the temporal attributes include a time associated with the requested file system operation.

10. The method of claim 5, wherein the type of the requested file system operation includes one of: a read operation; a write operation; or an execute operation.

11. The method of claim 1, wherein the one or more criteria of the security policy definition include one or more of: attributes of data; attributes of a user of a software application; attributes of a software application; temporal attributes; or a type of a file system operation.

12. The method of claim 1, wherein comparing the attributes and the security policy definition includes determining satisfaction of the one or more criteria of the security policy definition.

13. A data storage device providing secure data storage for a software application executed by an operating system in a computer system including at least one processor and memory operably coupled to the at least one processor, the data storage device comprising:

instructions that, when executed on the computer system, cause the computer system to implement:
 a file system operation interceptor that detects requests for file system operations in respect of data for the software application;
 a file system operation analyzer that is responsive to the file system operation interceptor and that analyzes an intercepted file system operation request to identify attributes associated with the file system operation that are independent of user attributes;
 a comparator that compares the attributes with a predefined security policy definition defining circumstances in which application data can be cryptographically processed, wherein the security policy definition includes a definition of one or more criteria for permitting the file system operation and the comparing includes determining if the attributes associated with the requested file system operation satisfy the one or more criteria, such that access control for the data is administered on a per-application basis; and
 a cryptographic unit that performs at least one or data encryption or data decryption using one or more cryptographic functions;
wherein the cryptographic unit is operable in response to the comparator to perform an encryption operation or a decryption operation on the data and effect performance of the requested file system operation by the operating system.

14. A non-transitory computer-readable storage element storing a computer program comprising computer program code to, when loaded into a computer system and executed thereon:

in response to a request for a file system operation in respect of data for the software application, the request identified by a file system operation interceptor executing on the computer system:
 identifying attributes associated with the requested file system operation that are independent of user attributes;
 retrieving a security policy definition defining circumstances in which application data can be cryptographically processed;
 comparing the attributes and the security policy definition, wherein the security policy definition includes a definition of one or more criteria for permitting the file system operation and the comparing includes determining if the attributes associated with the requested file system operation satisfy the one or more criteria; and
 responsive to the comparison, performing a cryptographic operation and the file system operation on the data, such that access control for the data is administered on a per-application basis.

* * * * *

UNITED STATES PATENT AND TRADEMARK OFFICE
CERTIFICATE OF CORRECTION

PATENT NO. : 11,537,723 B2
APPLICATION NO. : 16/073396
DATED : December 27, 2022
INVENTOR(S) : El-Moussa et al.

Page 1 of 1

It is certified that error appears in the above-identified patent and that said Letters Patent is hereby corrected as shown below:

On the Title Page

Column 2, item (56), under OTHER PUBLICATIONS, Line 3, delete "virtualiztion" and insert -- virtualization --, therefor.

In the Drawings

Sheet 1 of 2, FIG. 2, for Tag "214", Line 3, delete "Analyser" and insert -- Analyzer --, therefor.

In the Specification

In Column 7, Line 54, delete "invention." and insert -- disclosure. --, therefor.

In Column 7, Line 58, delete "invention" and insert -- disclosure --, therefor.

In Column 7, Line 61, delete "invention" and insert -- disclosure --, therefor.

In the Claims

In Column 10, Line 1, Claim 13, delete "one or" and insert -- one of --, therefor.

Signed and Sealed this
Twenty-third Day of May, 2023

Katherine Kelly Vidal
*Director of the United States Patent and Trademark Office*